United States Patent [19]

Röhm

[11] Patent Number: 4,627,627
[45] Date of Patent: Dec. 9, 1986

[54] PERCUSSION OR IMPACT DRILL CHUCK

[76] Inventor: Günter H. Röhm, Heinrich-Röhm-Str. 50, D-7927 Sontheim, Fed. Rep. of Germany

[21] Appl. No.: 743,583

[22] Filed: Jun. 11, 1985

[30] Foreign Application Priority Data

Jun. 15, 1984 [DE] Fed. Rep. of Germany ....... 3422195

[51] Int. Cl.⁴ ........................ B23B 31/04; B25D 17/08
[52] U.S. Cl. ..................................... 279/19.3; 173/48; 173/115; 279/1 K; 279/62; 408/241 R
[58] Field of Search ... 279/1 K, 1 ME, 19, 19.3-19.5, 279/60-65, 1 R, 1 B, 81, 89, 90, 93; 173/47, 48, 114, 115; 408/241 R

[56] References Cited

U.S. PATENT DOCUMENTS

| 3,133,601 | 5/1964 | Fulop ............................. 173/123 X |
| 3,929,343 | 12/1975 | Wanner et al. .................. 279/62 X |
| 4,131,165 | 12/1978 | Wanner et al. ........................ 173/48 |
| 4,491,444 | 1/1985 | Rumpp et al. ................. 279/19.4 X |
| 4,502,824 | 3/1985 | Dohse et al. .................... 279/1 B X |

FOREIGN PATENT DOCUMENTS

| 356396 | 9/1961 | Switzerland .......................... 173/47 |
| 2030485 | 4/1980 | United Kingdom .................. 279/60 |

Primary Examiner—Gil Weidenfeld
Assistant Examiner—Steven C. Bishop
Attorney, Agent, or Firm—Karl F. Ross; Herbert Dubno

[57] ABSTRACT

A drill chuck is secured on a drill spindle so as to be actuated thereby. The drill chuck has an axial passage through which the impact effect of a central anvil shaft is transferred to the end of the drill held in the drill chuck. The drill chuck can be connected to the drill spindle by coupling elements respectively arranged in coupling retainers of the drill spindle and/or the chuck body. The coupling retainers are axially of greater longitudinal dimension than the coupling elements, and permit axial displacement of the drill chuck. A contact ring which can not be displaced in axial direction presents an annular surface towards a further annular surface at the drill chuck body. Abutment projections can preclude axial displacement of the drill chuck on the drill spindle, and associated abutment recesses are also provided into which the abutment projections fit at least to a depth equivalent to the axial displacement movement of the drill chuck. The contact ring can be rotated to an extent that the abutment projections are aligned with the abutment recesses and can be retained therein, whereby the axial displacement of the drill chuck is allowed.

14 Claims, 4 Drawing Figures

PERCUSSION OR IMPACT DRILL CHUCK

CROSS REFERENCE TO RELATED APPLICATIONS

This application is related to Ser. No. 678,343 filed Dec. 5, 1984, to Ser. No. 686,243 filed Dec. 26, 1984, to Ser. No. 692,907 filed Jan. 1, 1985, to Ser. No. 692,902 filed Jan. 18, 1985, and to Ser. No. 702,049 and Ser. No. 702,053 filed Feb. 15, 1985.

FIELD OF THE INVENTION

My present invention relates to a percussion or impact drill chuck and, more particularly, to a chuck for a drill of the type which can be switched between operations in percussion drilling-mode and simple rotary drilling mode.

BACKGROUND OF THE INVENTION

A percussion or impact drill can have a drill chuck mounted on the drill spindle for rotation or turning therewith. The drill spindle can have a longitudinal or axial passage through which the impact force or action of a central ram shaft is imparted to a drill bit which is held in the drill chuck between centrically adjustable chuck jaws.

In such apparatus the ram or hammer shaft is axially guided in the hollow drill spindle, and coupling elements are provided for connecting the drill chuck to the drill spindle. The coupling elements can be arranged in retainers of the drill spindle and/or of the chuck body of the drill chuck.

In practice a drill chuck of this type is known which has a coupling ring which is guided in such a way that it cannot be shifted in axial direction, but is rotatably guided at the chuck body. The coupling ring can be fixed in respective positions in conformity with its rotation, and holds the respective coupling elements so that these are positively engaged in coupling retainers of the drill spindle. The coupling ring can be rotated into a position corresponding to the disengaged condition of the coupling, and the coupling elements can then move out of the coupling retainers at the drill spindle. The drill chuck can then be removed from the drill spindle by being displaced in axial direction.

In the coupled or engaged condition, the chuck body of the drill chuck is held on the drill spindle in such a way that substantially no axial play is experienced. This means that the coupling retainers in the drill spindle and in the drill chuck body have the same axial dimensions as the coupling elements so that the coupling elements are fixed in an axially directed and positively locking attitude with respect to the coupling retainers.

The coupling ring can be clamped against the chuck body by means of a clamping screw which, in turn, is radially guided in the coupling ring. However, this entails relatively large forces for clamping because the coupling ring also contains the guide retainers for the tensioning key which serves to open or close the drill chuck. The coupling ring, however, must not rotate with respect to the drill body in order to achieve the desired tightening of the drill chuck by means of the chuck key.

However, particularly in the case of percussion drilling, it is often desired that the drill chuck be arranged with a certain play or axial mobility with respect to the drill spindle. This prevents the mass of the drill chuck from intercepting and attenuating impact movements and eliminates negative influences upon the drilling operation.

OBJECTS OF THE INVENTION

It is therefore an object of this invention to provide an improved percussion drill apparatus which allows a sufficient amount of clearance for axial displacement or shifting of the drill chuck on the drill spindle.

It is also an object of the invention to provide a percussion drill apparatus in which a selection can be carried out to make use of the apparatus either with or without axial movement or play of the drill chuck on the drill spindle.

It is further an object of the invention to provide a percussion drill apparatus in which the selected operating mode can be quickly and easily changed.

SUMMARY OF THE INVENTION

These and other objects are attained by providing coupling recesses in the drill chuck body and/or in the drill spindle which are axially of greater length than the coupling elements. Accordingly, sufficient clearance or freedom is allowed for axial shifting of the drill chuck relative to and along the drill spindle.

A contact ring is arranged on the drill spindle. The axially fixed contact ring includes a first annular surface which is positioned so as to be axially opposite to, or facing towards, a second annular surface on the chuck body. At least one of these annular surfaces is formed with at least one abutment or contact projections which, when coming into operative contact with the respective other annular surface, preclude the axial shifting or displacement of the drill chuck on the drill spindle. The other annular surface is formed with cooperating abutment recesses, into which the abutment projections can lie and the depth of these abutment recesses is at least equal to the permitted axial displacement of the drill chuck.

The contact ring can be rotated at least until the abutment projections are aligned or register with the abutment recesses, and are then retained therein. The contact ring cannot be displaced in axial direction.

The percussion drill according to the invention can thus be selectively operated either with or without axial displacement of the drill chuck relative to the drill spindle, and the selected operating mode can be easily and quickly selected and/or adjusted, respectively.

For this purpose there is only required a turning of the contact ring which, accordingly, has two respective rotation positions in which the operation of the drill chuck is permitted either with or without the axial displacement thereof with respect to the drill spindle. Under these circumstances one need not provide for ease of operational replacement or exchanging of the drill chuck on the drill spindle.

According to a preferred embodiment of the invention, it is therefore sufficient when a collar of the contact ring extends axially over an annular flange of the drill chuck body, and a releasable securing ring is provided at the inner side of the collar, which securing ring reaches behind the annular flange. The securing ring then prevents the drill chuck from becoming separated from the drill spindle. When the securing ring is removed, the drill chuck can be readily removed and replaced.

Advantageously the annular flange forms the annular surface on the side of the drill chuck body, and the abutment recesses are also provided in the annular flange. In order for the mounting or assembly of the drill chuck body on the drill chuck spindle to be carried out by merely axially moving the various drill chuck components into one another, the coupling retainers located at the end of the drill chuck directed towards the spindle, and/or located at the end of the drill spindle directed towards the chuck, are formed as grooves which present a sufficient opening to allow installation of the respective coupling elements.

On that side which is directed away from the drill chuck, the contact ring is supported against an annular shoulder of the drill spindle such that the respective drilling pressure exerted by the drill spindle is transferred by way of a larger surface area via the contact ring to the drill chuck body.

Preferably the two rotation positions of the contact ring can be releasably fixed by a lock or detent device such that the axial displacement of the drill chuck is either prevented or allowed in conformity with the rotation position of the contact ring. The lock device is preferably comprised of at least one lock pin and of an opening in the drill spindle for receiving therein an effective portion of the detent pin so that the detent pin is positively retained. It is also preferred that the detent pin be radially guided in the contact ring while being subjected to spring pressure in the contact ring as well as projecting towards the drill spindle.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 3:
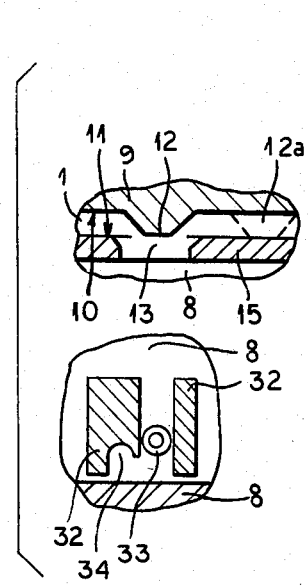
FIG. 3 is a cross-sectional view showing details of the drill chuck taken along line III—III in FIG. 1.
Figure 4:
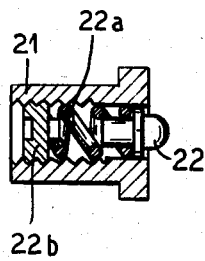
FIG. 4 is a cross section detail view of the lock device for the contact ring.

The percussion drill apparatus shown in the drawing is comprised of a drill spindle 1 of which only the lower portion is shown in the drawing. A drill chuck, generally identified by the reference numeral 2, is secured to the drill spindle 1 so as to be turned and/or to carry out the attendant motions therewith. The chuck 2 has a central axial passage 3 through which the percussion or impact action or stroke of a central percussion shaft 4 is transferred or imparted to the end of the respective drill D held in the lower end of the drill chuck 2. The central or anvil shaft 4 is axially guided in the hollow drill spindle 1, and is also only shown in part in FIG. 1.

Figure 2:
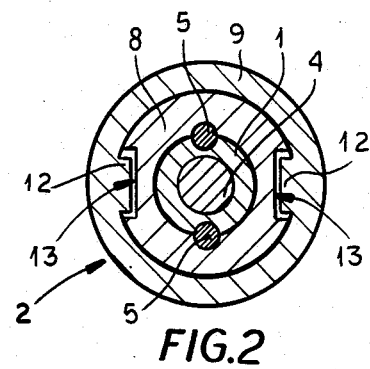
FIG. 2 is a cross section through the drill chuck, according to FIG. 1 taken along line II—II thereof.

Coupling elements 5 are provided for connecting the drill chuck 2 to the drill spindle 1. Two coupling elements 5 are provided, see FIG. 2, which are arranged in respective coupling retainers (recesses) 6 and 7 which are associated with the drill spindle 1 on the one hand and with the drill chuck 2 on the other hand. The coupling elements 5 are formed as short, axially extending pins which are positioned in both the axially extending grooves which form the coupling retainers 6 in the outer circumferential surface of the drill spindle 1, and retainers, recesses or grooves 7 in the inner circumferential surface of the drill chuck body 8.

The groove-shaped coupling retainers 6 and 7 are respectively formed at the upper end of the drill chuck body 8, and at the lower end of the drill spindle 1. Thus, the grooves 6 in the drill spindle 1 are directed with their openings towards the upper end of the chuck 2 and terminate at the lower end of the spindle 1. The grooves 7 in the chuck body 8 are directed with their openings towards the drill spindle 1, and terminate at the upper end of the chuck body 8.

Accordingly, the introduction of the coupling elements 5 between the drill spindle 1 and the drill chuck body 8 can be carried out without difficulties when the drill chuck body 8 is axially slid onto the end of the drill spindle 1, and is thereby held in such a rotational position relative to the drill spindle 1 that the groove-shaped coupling retainers 6 and 7 are aligned in pairs. In any case, the coupling retainers 6 and 7 in the drill chuck body 8 and in the drill spindle 1 are axially of greater longitudinal dimension than the coupling elements 5, so that an axial displacement or freedom of movement of the drill chuck 2 relative to the drill spindle 1 can be attained.

A contact ring 9 is arranged on the drill spindle 1, and cannot move in the longitudinal axial direction due to a lock device which will be described further below. The contact ring 9 includes an interior annular first surface 10 which faces an annular second surface 11 at the chuck body 8, i.e. the upwardly directed end of the chuck body 8.

The annular surface 10 provided at the contact ring 9 has abutment, contact, or cam projections 12, which when in contact at the oppositely positioned annular surface 11 of the drill chuck body 8, preclude the axial displacement of the drill chuck 2 on the drill spindle 1. This relative position between the contact ring 9 and the drill chuck body 8 is indicated at 12a in FIG. 3.

Accordingly, abutment recesses 13 are associated with the abutment projections 12 and are formed in the annular surface 11 of the drill chuck body 8. The contact projections 12 fit into the recesses 13, and the depth of the recesses 13 is at least equivalent to the axial displacement of freedom of movement of the drill chuck 2. The contact ring 9 can be rotated to such an extent that the contact projections 12 are in alignment with the abutment recesses 13, and they can be received therein so as to allow the axial displacement of the drill chuck 2. This relative position of the contact ring 9 and of the drill chuck body 8 is shown in solid lines in FIG. 3.

Furthermore, the arrangement of the embodiment is such that the contact ring 9 has a collar 14 extending axially over an annular flange 15 of the drill chuck body 8. On the inner side of the collar 14 is arranged a securing ring 16 which reaches or extends behind the annular flange 15, but is releasable therefrom, for securing the drill chuck body 8 against separation from the drill spindle 1.

The securing ring 16 is positioned like a spring ring in an annular groove at the inner circumferential surface of the collar 14. When the securing ring 16 is released, which can be achieved by a lateral opening 17 in the collar 14, the drill chuck body 8 can be removed from the drill spindle 1. Otherwise, the annular flange 15 forms the annular surface 11 on the upper side of the drill chuck 2. The abutment recesses 13 are also provided in the annular flange 15.

The contact ring 9 is supported, on the side which is facing away from the drill chuck 2, against an annular shoulder 18 of the drill spindle 1 while being secured on its opposite side by a snap ring 19. The snap ring 19 is mounted in an annular groove 20 of the drill spindle 1.

The contact ring 9 can assume two positions of rotation in which the axial displacement or freedom of movement of the drill chuck 2 is respectively precluded or allowed. These positions can be fixed by a lock or detent device 21. This lock or detent device 21 includes a lock pin 22 which is radially guided in the contact ring 9 while being maintained under spring tension against the drill spindle 1, and includes a recess 23 in the drill spindle 1 adapted in size to receive and positively retain the lock pin 22. Of course, when the spring pressure of spring 22a is released from pin 22, the pin can be released from the recess 23. The respective bore for pin 22 can be closed by a screw 22b.

Otherwise, the shown drill chuck 2 incorporates customary construction. Thus, centrically adjustable chuck jaws 24 are guided in the drill chuck body 8. The chuck jaws 24 can be adjusted by means of an adjustment or control ring 25 which can be rotated on the drill chuck body 8, but which otherwise can not be shifted in axial direction. Internal screw threads of the control ring 25 cooperate with external screw threads 26 or similar formations of the chuck jaws 24.

The adjustment or control ring 25 also includes exterior teeth formations 27 for engagement with the conical gear 28 of a tightening key 29 which, in turn, can be mounted at the drill chuck 2 for tightening or releasing of the drill D in the chuck 2. The adjustment or control ring 25 has on its outwardly directed side a further gear ring 30 which engages with the peripheral teeth of a lock sleeve 32. This sleeve 32 can be shifted in axial direction against the force of a spring 31. The lock sleeve 32 is held to be rotatable with the drill chuck body 8 by way of a lock member 33 mounted on the chuck body.

Figure 1:
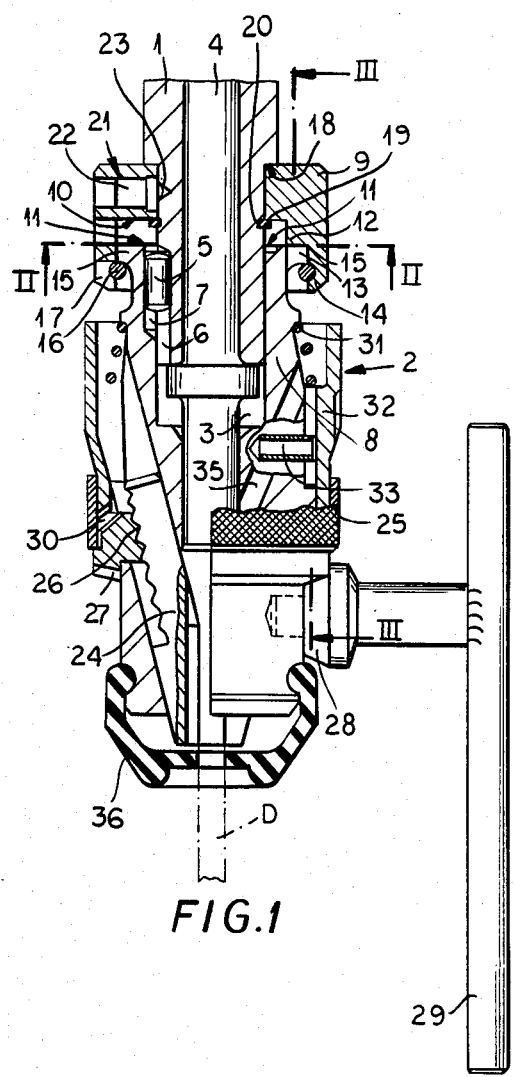
FIG. 1 shows a percussion drill apparatus according to the invention in longitudinal axial cross section and in part in side elevation.

When the lock sleeve 32 is in the position shown in FIG. 1, the control ring 25 is locked and cannot rotate relative to chuck body 8. Accordingly, undesired release or tightening of the drill chuck 2 during drilling or percussion drilling operation, respectively, is precluded.

When the lock sleeve 32 is axially reset against the pressure of spring 31 and rotated such that the lock member 33 enters into a catch 34 of sleeve 32, as is indicated in FIG. 3, the lock member 33 retains the lock sleeve 32 out of contact with the control ring 25. Thus, the control ring 25 can be actuated and the drill chuck 2 can be opened or closed, respectively. Dirt which enters into the drill retaining opening can be removed through channels 35 which extend in the drill chuck body 8 to the outside.

The drill D held between the chuck jaws 24 also extends through an end cap 36 or similar closure at the lower end of the chuck body 8 acting to prevent drilling debris from entering the drill chuck.

When considering the cross sectional view in FIG. 3, it will be appreciated that the abutment projections 12 can also project radially inwardly into the corresponding abutment recesses 13.

I claim:

1. A percussion drill comprising:
    a hollow drill spindle;
    a percussion drive shaft axially guided in said hollow drill spindle for imparting percussion action to a drill bit;
    a drill chuck mounted on said drill spindle and adapted to be engaged thereby for effecting corresponding turning and driving movements of said drill chuck and a respective drill, said drill chuck having a body with an axially directed passage therethrough for transferring the action of said drive shaft to the drill bit said chuck body having at least one first annular surface directed away from the drill bit;
    a plurality of coupling elements for connecting said drill chuck to said drill spindle, with each coupling element being adapted to be positioned in a coupling retainer of said drill spindle and said chuck body of said drill chuck, with each coupling retainer having an axial longitudinal dimension which is greater than that of the respective coupling element it receives and retains and adapted to allow axial displacement of said drill chuck relative to said drill spindle;
    a contact ring, said contact ring having a second annular surface, and said contact ring being adapted to be positioned such that said second annular surface is facing said at least one first annular surface of said drill chuck body;
    a plurality of abutment projections in at least one of said annular surfaces, said abutment projections when in operative contact with the respective other annular surface precluding axial displacement of said drill chuck on the drill spindle;
    wherein the other annular surface has formed in it a corresponding plurality of abutment recesses having a depth in conformity with the axial displacement of the drill chuck and allowing accommodation of the respective abutment projection; and
    wherein said contact ring is fixed to preclude axial movement thereof but being free to be rotated at least to such an extent that the abutment projections are aligned with the abutment recesses for allowing a respective abutment projection to be retained in a corresponding abutment recess.

2. The drill according to claim 1 wherein said chuck body also includes an annular flange, and said contact ring also includes a circumferential collar adapted to extend over said annular flange, and further comprising a releasable securing ring mounted on a respective inner side of said collar and adapted to reach behind said annular flange of said drill chuck body for operatively securing said chuck against said contact ring.

3. The drill according to claim 2 wherein said annular flange of said drill chuck body includes said at least one first annular surface thereof, and wherein said abutment recesses are also provided in said annular flange.

4. The drill according to claim 1 wherein the coupling retainers are formed by grooves in the drill chuck and grooves in the drill spindle, with respective openings of respective chuck grooves being directed towards the drill spindle, and respective openings of respective drill spindle grooves being directed towards the drill chuck.

5. The drill according to claim 4 wherein said drill spindle grooves terminate with a respective end of said drill spindle, and said chuck grooves terminate with a respective end of said drill chuck body.

6. The drill according to claim 1 wherein said drill spindle includes a circumferential outer shoulder and said contact ring is adapted to be abutted with a side which is directed away from said drill chuck against said circumferential outer shoulder of said drill spindle.

7. The drill according to claim 6 wherein said circumferential outer shoulder includes a continuous third annular surface.

8. The drill according to claim 1 in which said contact ring can selectively assume at least two positions such that in one position of said contact ring axial movement of said drill chuck is allowed, and wherein in another position of said contact ring axial movement of said drill chuck is precluded; and further comprising a detent device for fixing the contact ring in a selected position.

9. The drill according to claim 8 in which said drill spindle includes a receiving opening, and wherein said detent device comprises at least one lock pin guided in said contact ring, said lock pin being maintained under spring pressure in said contact ring, and said lock pin being adapted to extend into said receiving opening in said drill spindle for axially fixing the position of said contact ring.

10. The drill according to claim 1 wherein said drill chuck includes centrically adjustable chuck jaws for a respective drill bit.

11. An impact drill chuck adapted to be secured on a drill spindle through which an impact rod is displaceable, said chuck comprising:
   a chuck body;
   means for keying said chuck body on said spindle for limited axial displacement relative to said spindle and rotation jointly therewith;
   a ring axially fixed on said spindle, said ring having a first annular surface axially juxtaposed with a second annular surface formed on said body;
   a formation projecting axially on one of said surfaces and dimensioned to brace against the other of said surfaces to preclude axial displacement of said body on said spindle; and
   a recess formed in the other of said surfaces dimensioned to receive said formation to permit axial displacement of said body on said spindle upon relative rotation of said ring and said body.

12. The chuck defined in claim 11, further comprising detent means for releasably retaining said ring in at least one of two relative angular positions of said ring and said body.

13. The chuck defined in claim 12, further comprising:
   a plurality of jaws on said body displaceable toward and away from an axis thereof;
   a control ring rotatably mounted on said body and operatively connected to said jaws for displacing said jaws; and
   a spring-loaded locking sleeve axially shiftable on said body and engageable with said control ring for holding said control ring against rotation until said locking sleeve is retracted from said control ring.

14. The chuck defined in claim 13 wherein said body has a central bore traversed by an impact rod adapted to impact against a bit held in said jaws.

* * * * *